United States Patent [19]
Coeffic

[11] 4,446,685
[45] May 8, 1984

[54] RAKE WHEEL ATTACHMENT

[75] Inventor: Jean-Pierre Coeffic, Ottumwa, Iowa

[73] Assignee: Deere & Company, Moline, Ill.

[21] Appl. No.: 382,883

[22] Filed: May 28, 1982

[51] Int. Cl.³ .......................................... A01D 43/02
[52] U.S. Cl. .................................... 56/377; 56/10.2; 56/364
[58] Field of Search ............... 56/364, 377, 10.2, 10.4

[56] References Cited
U.S. PATENT DOCUMENTS

| | | | |
|---|---|---|---|
| 3,529,411 | 9/1970 | Johnston et al. | 56/377 |
| 3,678,669 | 7/1972 | Czajkowski | 56/314 |
| 4,182,103 | 1/1980 | McNutt | 56/364 |
| 4,214,429 | 7/1980 | Ellis | 56/377 |

Primary Examiner—Jay N. Eskovitz

[57] ABSTRACT

A rake wheel attachment for a harvesting machine such as a cylindrical baler comprises a wheel for engaging and moving crop material laterally of the path of the baler. The wheel is rotatably supported by a wheel support and is pivotably mounted on an arm attached to the machine about the axis of the arm which is generally perpendicular to the axis of the rotation. The rake wheel is biased into an operative position by a spring connected between the wheel support and the arm. The spring is yieldable to permit the wheel to pivot about the arm axis responsive to the engagement of the wheel with a rock or other foreign bodies.

14 Claims, 5 Drawing Figures

RAKE WHEEL ATTACHMENT

BACKGROUND OF THE INVENTION

This invention relates to forage harvesting equipment and more particularly relates to a rake wheel apparatus for use on forage harvesting equipment such as cylindrical balers and rakes generally.

Rake wheels are commonly used on side delivery rakes for moving crop material transversely of the direction in which the rake is being pulled through the field. Such a rake is exemplified in U.S. Pat. No. 3,529,411. It is also known to use such rake wheels as an attachment on harvest machines such as a cylindrical baler as illustrated in U.S. Pat. Nos. 3,678,669 and 4,182,103. In such an application, a pair of rake wheels are attached to the front of the baler. One wheel is mounted on each side and extends beyond the width of the baler pickup. As the baler is pulled through a field, the rake wheels rake crop material disposed on the ground outside of the pickup path of the baler transversely inwardly and into the path of the baler pickup. The wheels thus permit the baler to pickup crop material from a wider strip of the field than would otherwise be possible for each pass of the baler through the field.

As illustrated in U.S. Pat. No. 3,678,669, it is known to attach such wheels to a cylindrical baler with an arm pivotally connected at one end to the baler so that the wheel and arm may be moved between an operative and an inoperative position. The rake wheel is mounted at the other end of the arm and is pivotally connected so that the rake wheel is adjustable about a vertical axis.

It is also known, as disclosed in U.S. Pat. No. 4,182,103, to mount the rake wheel on a wheel support arm which is pivotally connected to the baler frame with a universal joint. The universal joint permits the wheel support arm to be pivoted simultaneously about a horizontal and a vertical axis. The universal joint is disclosed as providing protection for the wheel by permitting the wheel and arm (1) to pivot about a horizontal axis when uneven ground or an object such as a stub or a rock is encountered and, (2) also to pivot toward the baler tongue when the baler is backed up. The disclosed rake wheel lacks simplicity, restricts maneuverability of the tractor for pulling the baler, and has a mounting structure in front of the wheel which may interfere with the crop to be harvested.

SUMMARY OF THE INVENTION

Accordingly, it is an object of this invention to provide an improved rake wheel attachment for forage harvesting machines such as hay balers which is protected against damage when the rake wheel hits a foreign body such as rock or the ground when the machine is traversing rugged or bumpy terrain.

Another object of the invention is to provide a rake wheel attachment which has an improved means for pivotally mounting the rake wheel on the baler and for biasing the rake wheel into its operative position following engagement with a foreign body.

Another object of the invention is to provide a rake wheel attachment which is pushed during use on a drawn machine to provide adequate clearance for turning and maneuvering of the tractor for pulling the machine.

Still another object is to provide a rake wheel attachment which is pushed and has a mounting structure therefor located rearwardly of the rake wheel for avoiding interference with crop material being harvested.

These and other objects of the invention which will be apparent from a consideration of the following detailed description are accomplished by a raking apparatus or rake wheel attachment comprising a wheel for engaging and moving crop material along the ground and means for mounting the wheel for pivotal movement responsive to impact of the wheel with a foreign object. The mounting means protects the wheel against damage due to impact with a foreign body such as a rock or the ground in rugged terrain. The mounting means includes a means for biasing the wheel about the pivot axis to assume an operative position for engagement with the ground. Thus, the wheel is automatically reset following engagement with a foreign body.

The mounting means may be constituted by a variety of structures. In accordance with the preferred embodiment, the mounting means includes an arm connectible at one end to the harvesting machine and pivotally connected at the outer to a wheel support on which the wheel is rotatably mounted. The connection to the machine is rearward of the wheel. The bias means, which preferably includes a spring, is connected between the wheel support and the arm. The pivotal mounting which is preferably in a form of a cylindrical sleeve. A stop is fixed to the arm and is engageable with an abutment on the sleeve to define the operative position of the wheel. In accordance with the preferred embodiment as described above, a protective pivotal mounting for the rake wheel is simply and economically achieved.

DESCRIPTION OF THE PREFERRED EMBODIMENT

Figure 1:
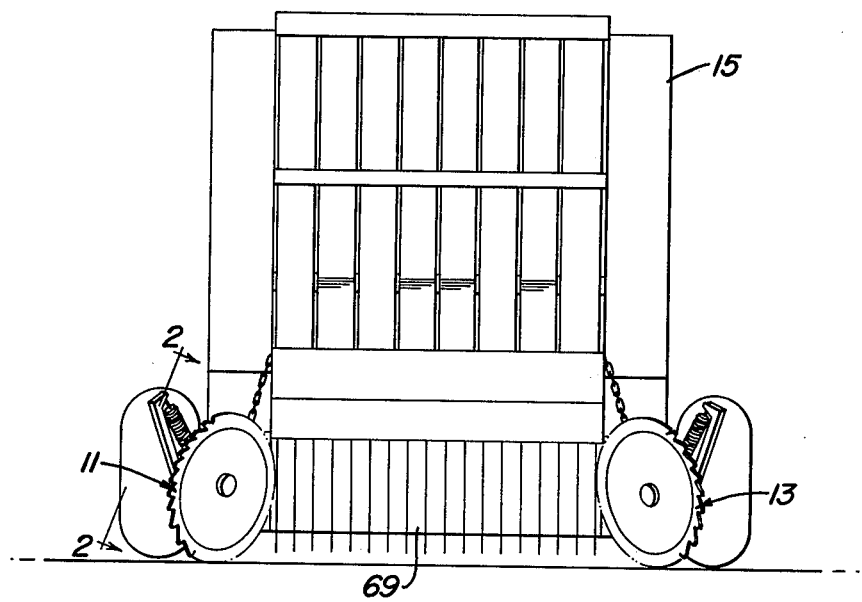
FIG. 1 is a front elevational view of a pair of rake wheel attachments in accordance with the features of the invention herein mounted on a cylindrical baler.
Figure 2:
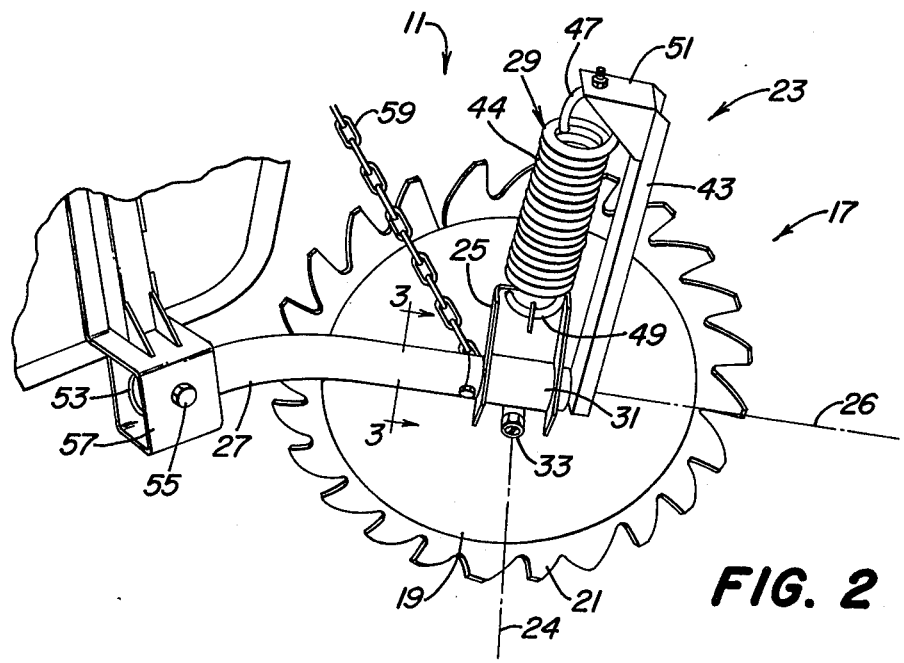
FIG. 2 is a side elevational view of the rake wheel attachment taken along line 2—2 of FIG. 1.
Figure 3:
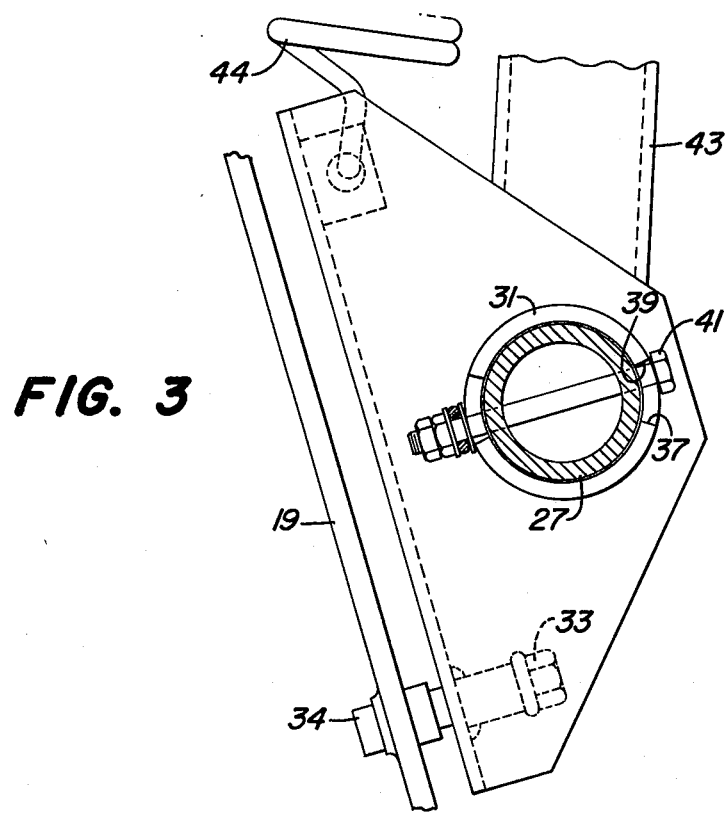
FIG. 3 is a rear elevational view of a portion of the mounting means for the rake wheel taken along line 3—3 of FIG. 2.

Reference is now made to FIGS. 1-3 which illustrate a preferred embodiment of a rake wheel attachment or apparatus for attachment to a forage harvesting machine. In FIG. 1 a pair of such apparatus 11, 13 are shown attached to a cylindrical baler 15 by way of illustration of the type of machine with which the rake wheel attachment may be used. Other machines on which the rake wheel attachments may be used are side delivery rakes, and forage harvesters. Rake wheel attachments 11, 13 are identical and, for convenience, only attachment 11 will be described herein.

Attachment or apparatus 11 includes a wheel 17 with a rim 19 and a plurality of rubber tines or fingers 21 fixed to rim 19 for engaging crop material disposed on the ground and moving the crop material laterally of the direction in which the baler 15 is being pulled. Apparatus 11 further includes a means 23 for rotatably mounting wheel 17 about an axis 24 and for pivotal movement about axis 26 perpendicular to the rotational axis 24. The perpendicular relationship of axes 24, 26 is for convenience and simplicity. It will be recognized that the relationship maybe varied so long as wheel 17 remains pivotable about axis 26 responsive to engagement with foreign bodies. Mounting means 23 includes a wheel support 25 for rotatably supporting wheel 17; a cylindrical, tubular arm 27 interconnected between baler 15 and wheel support 25; and a bias means 29 interconnected between arm 27 and wheel support 25 for biasing wheel 17 into an operative position. The operative position of the wheel is inclined about 5–15 degrees from a vertical plane.

Wheel support 25 includes a sleeve 31 pivotal mounting for one end of arm 27 and thereby provides a pivotal mounting for wheel 17 about axis 26 perpendicular to the axis of rotation 24 of the wheel 17. Wheel 17 is rotatably mounted in wheel support 25 by a spindle 33 bolted in wheel support 25. Spindle 33 is rotatably supported in bearings 34 in rim 19 in a conventional manner. Pivotal movement of wheel support 25 about arm 27 is limited by the engagement of a pair of abutting surfaces 37, 39 formed in sleeve 31 with a stop or bolt 41 inserted through arm 27. The engagement of bolt 41 with abutting surface 37 defines the operative position of wheel 17. The engagement of abutting surface 39 with bolt 41 defines the protective position of wheel 17 to which it may be rotated responsive to engagement with the ground, a rock or other foreign body.

Wheel 17 is biased into its operative position by bias means 29 which preferably includes a bracket 43 bolted at one end of arm 27 and a spring 44 having a first end 47 fixed to one end 51 of bracket 43 and second end 49 fixed in wheel support 25. In accordance with other embodiments of bias means 23, spring 44 may be replaced with a torsion bar or hydraulic cylinder to yieldably retain wheel 17 in an operative position.

Arm 27 is pivotally connected to baler 15 at an end 53 which is rearward of wheel 17 for pivotal movement between an operative position in which fingers 21 engage the ground and an inoperative position in which the wheel 17 is elevated above the ground. The mounting of arm 27 to baler 15 may be accomplished simply by a bolt 55 rotatably supporting arm 27 in a tubular bracket 57. A chain 59 is provided to retain wheel 17 in an inoperative position elevated above the ground. By having the pivot of arm 27 rearwardly of wheel 17, wide clearance in front of the baler is permitted allowing good steering and maneuverability as drawn by a tractor.

Figure 4:
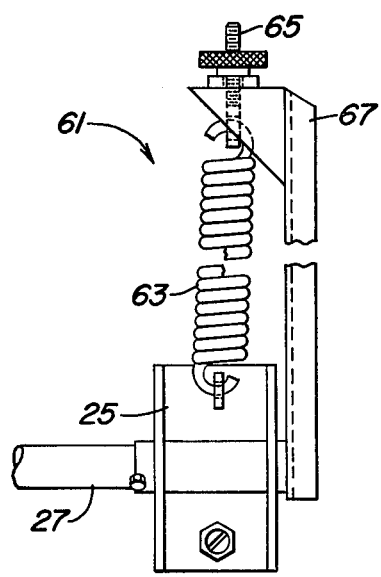
FIG. 4 is a fragmentary view of an alternate embodiment of the means for biasing the rake wheel into its operative position.

Reference is now made to FIG. 4 which illustrates an alternate embodiment 61 to bias means 29 (shown in FIGS. 1–3, 5). The embodiment of FIG. 4 is identical to the embodiment of FIGS. 1–3, 5 except for bias means 61 and bias means 29 respectively. Identical parts in the two embodiments are identically enumerated for convenience. In bias means 61 the tension imposed by a spring 63 on wheel support 25 for maintaining wheel 17 in an operative position is adjustable. The adjustability is accomplished by changing the length of spring 63 by rotation of bolt 65 threaded through one end of a bracket 67. As will be understood when the bolt 65 is rotated so as to lengthen the spring 63, tension on wheel 17 is increased, and when the bolt is rotated so as to shorten spring 63 tension on wheel 17 is reduced. Such adjustment may be desirable for controlling the force with which the wheel will engage the ground without yielding from its operative position by extension of spring 63.

OPERATION

Figure 5:
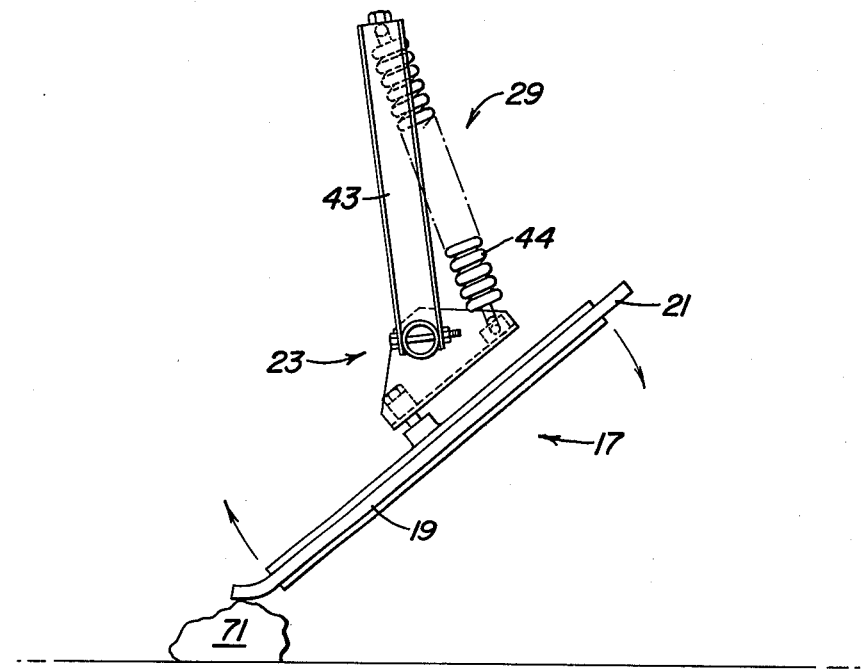
FIG. 5 is a view of the rake wheel attachment of FIG. 1 showing the rake wheel pivoted about a horizontal axis responsive to the engagement of the wheel with a foreign body.

In operation, baler 15 is pulled through a field with the baler straddling a windrow of hay. When the width of the windrow exceeds the width of baler pickup 69, rake wheel attachments 11, 13, as they are pushed and rolled along the ground, engage the crop material and move it transversely inwardly into the path of baler pickup 69. Wheel 17 is normally maintained in a vertical or operative position by the bias of spring 45 retaining abutting surface 37 of sleeve 31 in engagement with stop or bolt 41. If a foreign object such as a rock 71 is in the path of wheel 17, wheel 17 is pivoted to an inoperative position as shown in FIG. 5 by the pivotal movement of sleeve 31 about arm 27 against the bias of spring 44. When wheel 17 pivots about arm 27, the forward face of wheels 17 pivots toward an opposed relationship with the ground permitting object 71 to pass under wheel 17. As a result damage to wheel 17 is reduced or prevented. When wheel 17 has passed over rock 71, the bias of spring 44 restores wheel 17 to an operative position with abutting surface 37 in engagement with bolt 41. Similarly, pivotal movement of wheel 17 about axis 26 perpendicular to the axis of rotation 24 is permitted when the baler 15 is being pulled over rugged terrain and wheel 17 is pushed into engagement with the ground with excessive force. Such excessive force is accommodated by the pivotal movement of wheel 17 against the bias of spring 44.

It will be appreciated that this invention provides simplicity of construction, safety against damage, wide clearance in front of the harvesting machine for maneuverability of the tractor for pulling the machine, and freedom from interference of the mounting structure for the wheel with the crop to be harvested.

The invention has been described in connection with a preferred embodiment and certain modifications thereof. It will be recognized by those skilled in the art that other embodiments and modifications thereof (particularly, the mounting means 23), are possible and within the scope of the disclosed invention. Accordingly it is intended that all such embodiments and modifications thereof be comprehended by the scope of the appended claims.

I claim:

1. In a raking apparatus for a harvesting machine, said apparatus comprising:
   a wheel for engaging and moving crop material along the ground;
   an arm connected between said machine and said wheel, said arm having a longitudinal axis; and
   means mounting said wheel on said arm for rotation, the improvement comprising:
   said mounting means mounting said wheel for pivoting about said longitudinal axis responsive to impact of the wheel with a foreign object.

2. The apparatus of claim 1 wherein said mounting means comprises means for biasing said wheel about said horizontal axis to assume operative position.

3. The apparatus of claim 2 wherein said mounting means further comprises a wheel support for supporting said wheel for rotation about said longitudinal axis.

4. The apparatus of claim 3 wherein said bias means is fixed at one end to said arm and at other to said wheel support.

5. The apparatus of claim 4 wherein:
said arm is a cylindrical tube and includes a stop fixed thereto; and
said wheel support includes a sleeve mounted on said tube, said sleeve having an abutment engageable with said stop when said wheel is in said operative position.

6. The apparatus of claim 5 wherein said bias means includes means for adjusting the bias imposed on said support for maintaining said wheel in said operative position.

7. The apparatus of claim 6 wherein said bias means includes a bracket fixed at one end to said arm and a spring fixed at one end to said bracket and at the other end to said wheel support.

8. In a raking apparatus for a harvesting machine, said apparatus comprising:
a wheel for engaging and moving crop material along the ground, said wheel having opposed faces;
a support arm mounted to the machine and extending forwardly therefrom; and
means mounting said wheel on said arm for rotation and for supporting said wheel with one face facing forwardly;
the improvement wherein said mounting means mounts said wheel for pivotable movement about an axis of said arm responsive to the impact of a foreign object with said one wheel face, said one wheel face pivoting toward an opposed relationship with the ground permitting said object to pass under said wheel when said wheel pivots about said axis.

9. The apparatus of claim 8 wherein:
said arm is a cylindrical tube and includes a stop fixed thereto,
said mounting means includes a sleeve pivotably mounted on said tube, and
said sleeve having an abutment engagable with said stop when said wheel is in said operative position.

10. The apparatus of claim 8 comprises means for biasing said wheel about said arm axis to assume an operative position.

11. The apparatus of claim 10 wherein said bias means includes a bracket fixed at one end to said arm and a spring fixed at one end to said bracket and at the other end to said wheel support.

12. The apparatus of claim 8 wherein the wheel is located forwardly of the location for mounting said arm to the machine.

13. The apparatus of claim 8 wherein said mounting means is attached to the rear face of the wheel.

14. The apparatus of claim 10 wherein said bias means includes means for adjusting the bias imposed on said wheel.

* * * * *